United States Patent [19]
Rossbach et al.

[11] Patent Number: 6,157,999
[45] Date of Patent: Dec. 5, 2000

[54] DATA PROCESSING SYSTEM HAVING A SYNCHRONIZING LINK STACK AND METHOD THEREOF

[75] Inventors: Paul C. Rossbach; Albert R. Kennedy; Jeffrey P. Rupley, II; Bradley G. Burgess, all of Austin, Tex.

[73] Assignee: Motorola Inc., Schaumburg, Ill.

[21] Appl. No.: 08/868,467

[22] Filed: Jun. 3, 1997

[51] Int. Cl.[7] ................................................ G06F 9/42
[52] U.S. Cl. ................................ 712/243; 712/239
[58] Field of Search .................................. 712/240, 237, 712/238, 239, 234, 243, 230

[56] References Cited

U.S. PATENT DOCUMENTS

| | | | |
|---|---|---|---|
| 5,623,614 | 4/1997 | Van Dyke et al. | 712/240 |
| 5,687,349 | 11/1997 | McGarity | 711/137 |
| 5,748,976 | 5/1998 | Taylor | 712/240 |
| 5,796,997 | 8/1998 | Lesartre et al. | 712/234 |
| 5,875,325 | 2/1999 | Talcott | 712/240 |
| 5,896,528 | 4/1999 | Katsuno et al. | 712/239 |
| 5,943,494 | 8/1999 | Golla et al. | 712/238 |
| 5,948,100 | 9/1999 | Hsu et al. | 712/238 |
| 5,954,815 | 9/1999 | Joshi et al. | 712/237 |

*Primary Examiner*—Meng-Ai T. An
*Assistant Examiner*—J. Chang

[57] ABSTRACT

When a request to branch to an address stored in a return memory location (440) occurs, a busy bit is used to determine whether the return memory location (440) contains updated information. When the information is not updated, a predicted address is provided to the prediction verifier (460) by the link stack (410). Once the busy bit is valid, the prediction verifier (460) determines if a proper prediction was made. When an improper prediction was made, the update portion (415) of the link stack (410) based on information from the comparator (425) determines if a value stored in the link stack (410) matches the value stored in the return memory location (440). The link stack (410) is synchronized based upon a favorable comparison indicating the return memory location value matches a value in the link stack. If a match is not found, the predicted address is placed back on the link stack or alternatively the link stack is cleared.

15 Claims, 4 Drawing Sheets

| LABELS | ADDRESS | INSTRUCTION | |
|---|---|---|---|
| | A | BL HERE1 | |
| | A+4 | ⋮ | |
| | A+8 | | |
| HERE1: | | MFLR | G3 |
| | | ST | G3, MEM |
| | ⋮ | ⋮ | |
| | B | BL HERE2 | |
| | B+4 | ⋮ | |
| | ⋮ | LD | G3, MEM |
| | | MTLR | G3 |
| | B+X | BCLR | |
| HERE2: | | ⋮ | |
| | C | BCLR | |

*100*

*200*

DATA PROCESSING SYSTEM HAVING A SYNCHRONIZING LINK STACK AND METHOD THEREOF

FIELD OF THE INVENTION

The present invention relates generally to microprocessors, and specifically to microprocessors using a link stack.

BACKGROUND OF THE INVENTION

Many performance considerations go into the design of a modern microprocessor system. One such design consideration deals with handling returns from subroutines. How a microprocessor handles returns from subroutines is important to performance because subroutine calls and returns are frequently occurring events. Therefore, the more efficiently subroutine returns are handled, the greater the overall performance achieved from a data processing system.

Subroutine calls can be supported with the use of a link register (LR) and a branch-and-link instruction. The branch-and-link instruction will be referred to as the "branch-and-link". The branch-and-link is defined to be an instruction which branches to an address specified by a generic subroutine call while saving the address of the instruction after the branch-and-link into the link register. Note that the branch-and-link will overwrite the existing value in the link register. Subroutine returns can be supported by a branch-to-link instruction (which from now on will be referred to as "branch-to-link"). The branch-to-link is defined to be an instruction which uses the value in the link register as the next instruction fetch address.

Because the link register is overwritten whenever a branch-and-link is executed, a means of saving off the current value of the link register is provided by a "move from link register" type instruction, which from now on will be referred to as MFLR. A MFLR copies the current value of the link register into a general purpose register (GPR). Note that after the current value of the link register is copied to the GPR, the value can be stored out to memory using a store instruction. It should be noted that the terms MFLR, GPR, as well as other specific references throughout the present application are used to describe generic elements or events, and are not meant to limit the present invention to any particular technology type.

An explicit means for moving a value into the link register is provided by a "move to link register" instruction (which from now on will be referred to as MTLR) which copies a specified GPR value into the link register. Note that unlike a branch-and-link which branches and updates the link register, the MTLR only updates the link register without having to execute a branch.

A typical instruction sequence for a series of subroutine calls and returns is shown in FIG. 1. Specifically, the instructions are listed along with corresponding addresses and labels. In this figure, instructions beginning at the label HERE1 can be envisioned as part of a subroutine. A call to the subroutine starting at HERE1 is made at address A via the branch-and-link instruction BL. As a result of this branch-and-link, the address A+4 is saved into the link register. Note, 4 is the instruction word length. The program beginning at HERE1 saves the link register value to memory, via the MFLR and store instruction, and continues executing instructions.

Within the HERE1 subroutine, another subroutine call is made via a branch-and-link to HERE2. This branch-and-link causes the value B+4 to be stored into the link register and branch to HERE2. In the program beginning at label HERE2, the link register is not saved because, in this example, no other subroutine calls are going to be made and therefore the current link register value can be used for the return. The return from HERE2 back to HERE subroutine is accomplished with a branch-to-link instruction which causes a branch back to the address specified by the valu in the link register (B+4, where 4 is the instruction size). The return from the HERE1 subroutine is made by loading the saved link register value (A+4) back from memory into a GPR (G3 in the example), performing a MTLR which puts the value in G3 (A+4) in the link register, and then performing a branch-to-link.

A problem occurs if, when wanting to return from a subroutine using the branch-to-link, the link register value has not yet been updated with the value from memory. This delay in updating the LR is typical due to long memory reference latencies compared to the clock speeds of modern microprocessors. While waiting for the link register value to be updated, the next instruction fetch address is not known, no new instructions are fetched, and therefore, the processor may not be able to do useful work degrading performance.

Prior art helps to reduce this performance degradation with the use of a link stack (LS). The LS provides a means for predicting the link register value to be used as the next instruction fetch address. The link stack is discussed in terms of having a "current location". The current location references the next fetch address to be predicted by the link stack. The current location may be stored in a circular buffer having a top pointer and a bottom pointer, in a buffer having a fixed bottom and a point referencing the top current location, or the link stack may consist of Last-In-First-Out (LIFO) buffer wherein each data value is shifted toward a current location as the current location is retrieved.

The current location is updated with the same value as the link register whenever a branch-and-link is executed. When the current location is updated, the previous current locations are pushed one entry deeper into the stack. When a branch-to-link is executed and the link register is not available, the value of the current location of the link stack is predicted to be the next instruction fetch address and is used as such. When this occurs, the current location is popped from the stack and previous current entries are moved up one entry which causes the next entry on the stack to become the current location. It would be understood by one skilled in the art that the link stack has a finite depth (eg. 8 locations).

Looking again at FIG. 1, when the branch-and-link at A is executed, the current location of the link stack (along with the link register) would be updated with A+4. When the branch-and-link at B is executed, the current entry of the link stack would be updated with B+4 and the previous current entry, the entry containing A+4, would be pushed one entry deeper into the stack. Upon executing the branch-to-link at C, the process of returning from subroutine HERE2 would cause the entry containing B+4 to be pulled off the stack and the entry containing A+4 becomes the current entry. Upon the returning from HERE1 the branch-to-link at B+x would cause the entry containing A+4 to be popped off the stack. It is important to not( that if the link register value was not available when executing the branch-to-link at B+x, because the load instruction had not yet brought in the value, the A+4 value popped from the link stack would be predicted to be the next instruction fetch address. In this particular example, the prediction would be correct and the processor will be able to accomplish useful work while waiting for the load to finish.

The use of link stacks to predict branches in this fashion provides the ability to speculatively continue execution until the link register is updated and the prediction can be verified. If the prediction was correct, the program flow continues normally. Otherwise, in the event an inaccurate prediction has been made, the speculative instruction path will be discarded and a branch to the actual link address occurs.

The use of a link stack works well until a return from a subroutine directs flow to a routine from which it was not called or a branch-to-link is used as a jump rather than as a subroutine return. For example, FIG. 2 illustrates an initial program flow from a routine A into a subroutine B, from within subroutine B to subroutine C, and likewise through subroutine G. The prior art works well if the return flow from G proceeds back to F. However when a return from subroutine G does not return to its calling routine F, the sequence returns are out of order. The return from subroutine G to subroutine E represents such an out of order sequence. In this case, the link stack directs prediction to return to subroutine F which will be incorrect.

The prior art link stack (not shown) is also no longer advantageous when a branch-to-link instruction is used as a jump rather than as a subroutine call. This happens when a program performs a branch-to-link to implement a jump to another part of the subroutine. In this case, the address provided by the link stack for the prediction will be incorrect. Upon detection of the misprediction, the entire link stack is invalidated requiring all information in the stack to be lost. Therefore, a data processor capable of overcoming the prior art problem of losing all link stack information upon a misprediction would be desirable.

BRIEF DESCRIPTION OF THE DRAWINGS

The present invention is illustrated by way of example and not limited in the accompanying figures, in which like references indicate similar elements, and in which.

Skilled artisans appreciate that elements in the figures are illustrated for simplicity and clarity, and have not necessarily been drawn to scale. For example, the dimensions of some of the elements in the figures are exaggerated relative to other elements to help to improve understanding of embodiment(s) of the present invention.

DETAILED DESCRIPTION OF THE DRAWINGS

When a request to branch to an address stored in a link register occurs, a busy bit is used to determine whether the link register contains updated information. When the information is not updated, a predicted address is provided to a Prediction verifier by the link stack. Once the busy bit is inactive, the prediction verifier determines if a proper prediction was made. When an improper prediction was made, a comparator of the link stack is used to determine if a value stored in the link stack matches the correct value, now stored in the link register. The link stack is synchronized based upon a favorable comparison indicating the link register value matches a value in the link stack.

Figure 3:
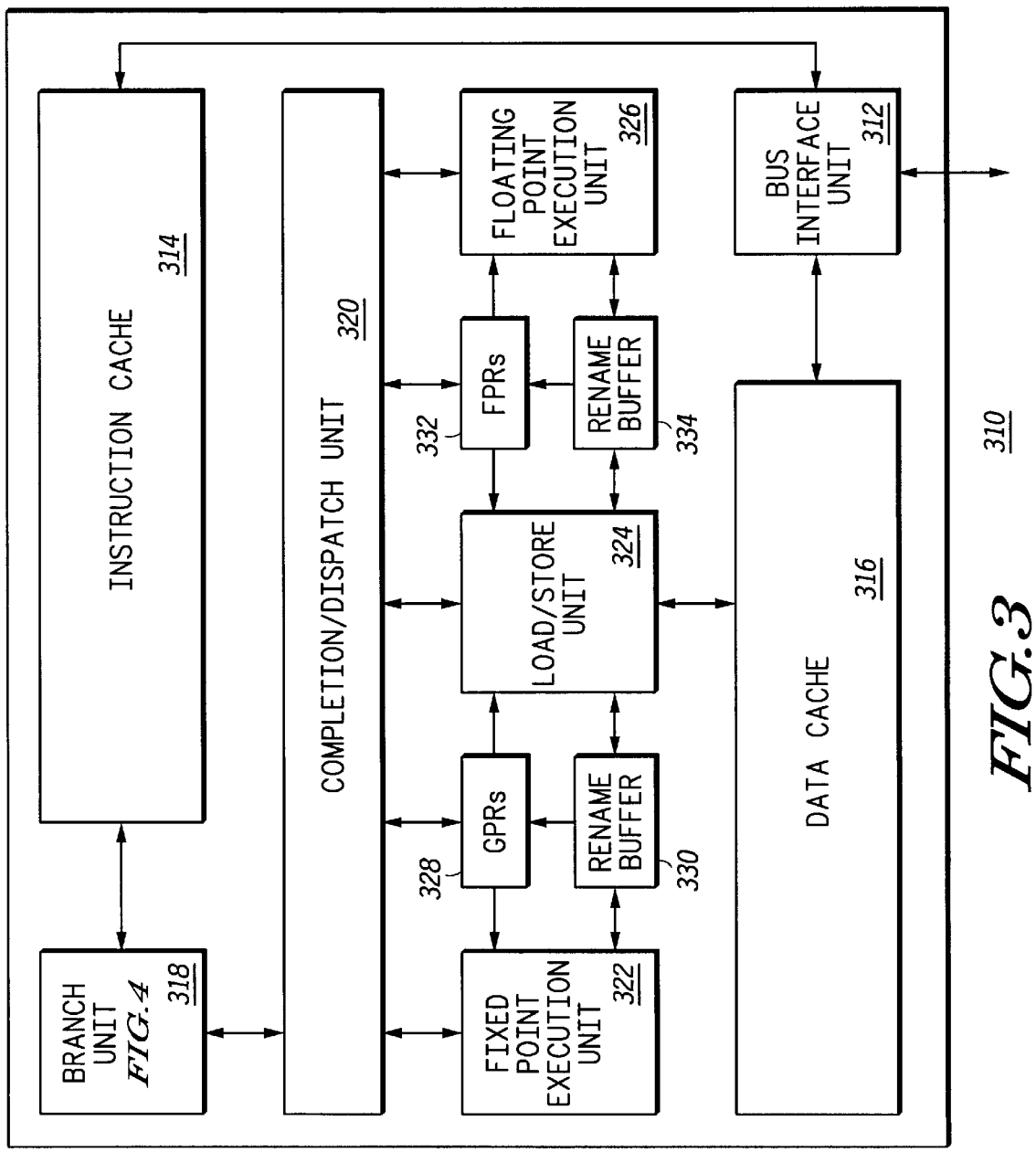
FIG. 3 illustrates, in block diagram form, a data processor in accordance with the present invention.

FIG. 3 depicts a block diagram of a data processor 310 constructed in accordance with the present invention. Data processor 310 is a data processor that improves its performance by using branch prediction methodologies. Data processor 310 is capable of predicting whether each branch instruction will be taken or will not be taken. Data processor 310 then fetches instructions at the predicted address and begins executing these instructions. Later, data processor 310 resolves whether the branch should have been taken or should not have been taken and performs corrective measures if it predicted incorrectly. These corrective measures are used by the present invention to determine if synchronization is needed.

Continuing with FIG. 3, a bus interface unit (hereafter BIU) 312 controls the flow of data between data processor 310 and the remainder of a data processing system (not depicted). BIU 312 is connected to an instruction cache 314 and to a data cache 316. Instruction cache 314 supplies an instruction stream to a branch unit 318 and to a completion/dispatch unit 320. Branch unit 318 is more fully described below in connection with FIG. 4. Completion/dispatch unit 320 forwards individual instructions to an appropriate execution unit. Data processor 310 has a fixed point execution unit 322, a load/store execution unit 324, and a floating point execution unit 326. Fixed point execution unit 322 and load/store execution unit 324 read and write their results to a general purpose architectural register file 328, (labeled GPRs and hereafter GPR file) and to a first rename buffer 330. Floating point execution unit 326 and load/store execution unit 324 read and write their results to a floating point architectural register file 332, (labeled FPRs and hereafter FPR file) and to a second rename buffer 334.

Completion/dispatch unit 320 issues the individual instructions to the various execution units 322, 324 and 326. Each of the execution units performs one or more instructions of a particular class of instructions. The particular class of instructions of each execution unit is indicated by the name of the execution unit. For instance, floating point execution unit 326 executes floating point arithmetic instruction.

Fixed point execution unit 322 returns the results of its operations to designated entries in first rename buffer 330. First rename buffer 330 periodically updates an entry of GPR file 328 with an entry from first rename buffer 330 when all instructions preceding the instruction that generated the result have updated their GPR file entries. Completion/dispatch unit 320 coordinates this updating. Both first rename buffer 330 and GPR file 328 can supply operands to fixed point execution unit 322. Conversely, floating point execution unit 326 returns the results of its operations to designated entries in second rename buffer 334. Second rename buffer 334 periodically updates an entry of FPR file 332 with an entry in second rename buffer 334 when all instructions preceding the instruction that generated the result have updated their FPR file entries. Completion/dispatch unit 320 also coordinates this updating. Both second rename buffer 334 and FPR file 332 supply operands to floating point execution unit 326.

Load/store unit 324 reads data stored in GPR file 328, first rename buffer 330, FPR file 332 or second rename buffer 334 and writes the selected data to data cache 316. This data may also be written to an external memory system (not depicted) depending open operating characteristics of data processor 310 not relevant to the disclosed invention.

Figure 4:
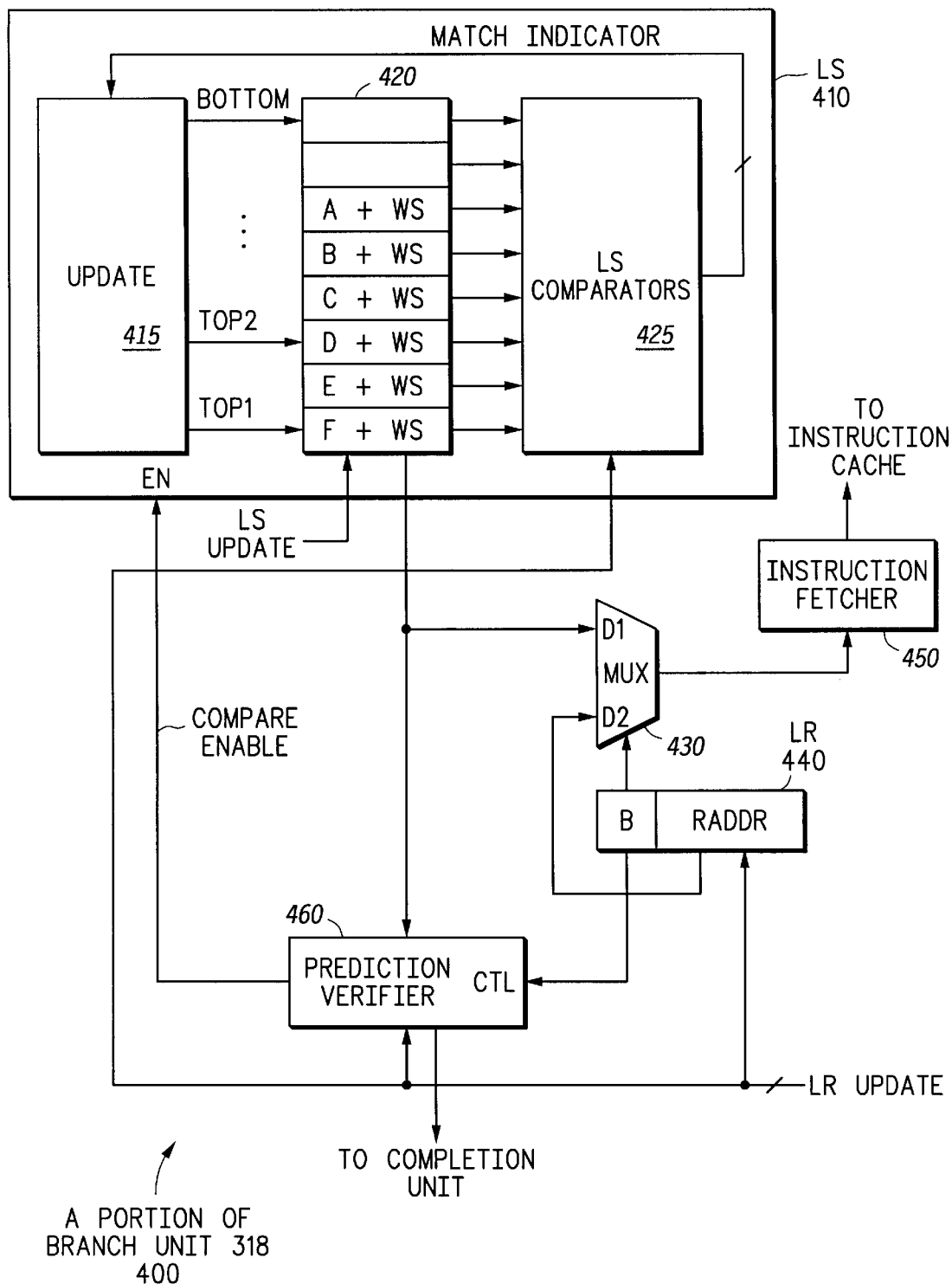
FIG. 4 illustrates, in block and logic diagram form, a portion of the branch unit 318 of FIG. 3.

FIG. 4 illustrates a portion 400 of branch unit 318 of FIG. 3. The portion 400 includes a link stack 410 (LS), instruction fetcher 450, multiplexer 430, link register 440, and prediction verifier 460. The link register 440 is connected to receive a link register update signal labeled LR UPDATE and includes a busy bit (B) storage element, and a storage element, or return address storage portion, labeled RAddr for storing a return address. The busy bit storage element is connected to an enable node of the multiplexer (MUX) 430 and to a control node (CTL) of the prediction verifier 460. The prediction verifier generates a COMPARE ENABLE signal and is connected to the completion unit 320. The storage element RAddr of the link register 440 is connected to a second data input node (D2) of the MUX 430.

The link stack 410 has an enable node for receiving a signal labeled COMPARE ENABLE, and includes a plurality of return address storage locations 420. The storage, or memory locations 420 are connected to the link stack comparator 425, which generates a match indicator signal. The match indicator signal is received by an update portion 415 which in turn updates the link stack to provide a current link stack value which is the next data to be output.

The memory locations 420 of the link stack 410 are further connected to the prediction verifier 460 and to the first data input node (D1) of MUX 430. The update portion 415 identifies a current storage location or cause a current storage location to be identified. The update portion 415 and comparator 425 are, for purposes of discussion, considered to be a portion of the link stack 410, and is controlled by the enable node of the link stack 410. The enable node of the link stack receives a COMPARE ENABLE signal from the prediction verifier 460.

One skilled in the art will recognize that the compare function and update circuitry can be segmented differently than illustrated. For example, the compare portion may actually be physically associated with a different portion of the microprocessor.

In FIG. 4, the link stack 410 is discussed in terms of having a current location. The current location references the next address to be predicted by the link stack 410. The current location may be stored in a circular buffer having a top pointer and a bottom pointer, in a buffer having a fixed bottom and a pointer referencing the top current location, or the link stack 410 may consist of a Last In First Out (LIFO) buffer, wherein as a data is popped from the LIFO each previous data value is shifted toward the current location as the data in the current location is retrieved. Likewise, as data is pushed onto the LIFO, the previously stored data values are shifted away from a current location output. Where a LIFO is used, the update portion would cause a specific number of values to be popped from the link stack. Where the current value is accessed by a pointer, the update portion would update the pointer to indicate the current value.

In operation, the link stack 410 of FIG. 4 contains pending return locations from subroutines. For example, the location labeled A+WS represents the calling address (A) plus an instruction word size (WS) stored in a memory location, thereby effectively pointing to the next address to be executed upon return from the called subroutine. The link stack 410 is illustrated to have six stored addresses (A+WS through F+WS) indicating that six pending returns from subroutines exist. The last return address stored in the link stack 410, which is the most current data, will generally reside within the link register 440 unless modified by program code via a MTLR command affecting the link register 441). This occurs because the calling branch-and-link command pushes the address to both the link register 440 and the link stack 410. In FIG. 4, the current entry of the stack is indicated by the arrow TOP1. The previously current entry has pushed down on the stack and is the next-in-sequence entry in that it will normally be the next referenced entry.

Figures 1, 2:
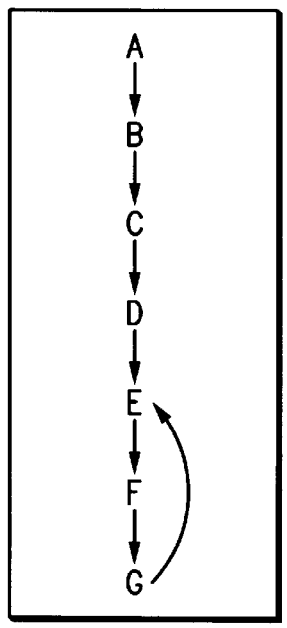
FIG. 1 illustrates, in table form, a set of instructions for making and returning from subroutine calls.
FIG. 2 illustrates, in diagram form, a flow illustrating an out of order subroutine call.

Upon completion of the subroutine called from location F, a branch-to-link instruction would be executed and one of two cases occurs. In the first case, as illustrated in FIG. 1 in the subroutine labeled HERE2, a branch-to-link instruction is executed without its value needing to be restored from memory. In this situation, the program returns immediately to the address stored in the location of the link register 440. Since this value is known to be valid, the current stack location will be updated to the next in-sequence value. The second case occurs where the link register 440 value itself needs to restored as previously described. When this occurs, the branch-to-link register 440 operation cannot occur from the link register until after the link register 440 value has been restored from memory. Until updated, the busy bit (B) will be set to its active state. As a result, the return address is predicted by providing the address value currently pointed to by the current location of the link stack 410 to the instruction fetcher 450 via MUX 430. In addition, this predicted address value is provided to the prediction verifier 460 for future verification that the value ultimately restored to the link register 440 by a MTLR instruction is the value predicted and issued to the instruction fetcher. If, upon the restoration of the actual return address to the link register 440, the prediction verifier 460 determines that the actual address matches the predicted address, the instruction fetcher is allowed to continue with the current program flow in normal fashion. However, when the link stack 410 did not predict the value actually restored, then the prediction verifier 460 signals to the completion unit 320 of the data processor 310 that an invalid prediction was made.

When a prediction is invalid, the prediction verifier 460 drives the COMPARE ENABLE node active. When the Compare Enable node is driven active, the addresses stored in locations 420 of the link stack 410 ar compared by comparators 425 to the actual address returned by the LR UPDATE node. If the actual value returned to the link register 440 via the LR UPDATE node is found to reside in a location 420 of the link stack 410, the link stack 410 will be updated, and thereby synchronized. For example in FIG. 4, the label TOP2 represents a new current location when the address E+WS matches the new link register 440 address. This synchronization will result in saving four possibly correct return values within the link stack 410 (A+WS through D+WS). Identifying possibly correct link addresses by comparing link stack values to the returned link register value is referred to as "synchronizing the link stack". Synchronizing the link stack provides an advantage over the prior art in that the prior art would invalidate the entire link stack 410, and thereby reduce the overall efficiency of the data processor system due to its inability to synchronize the link stack 410 with the actual subroutine's location.

When no match is identified during a synchronization, the existing stack can be maintained or invalidated based upon design specifications. In fact, there could be a register (not shown) associated with the design, allowing a user to specify a specific action when no match occurs during synchronization.

Figure 5:
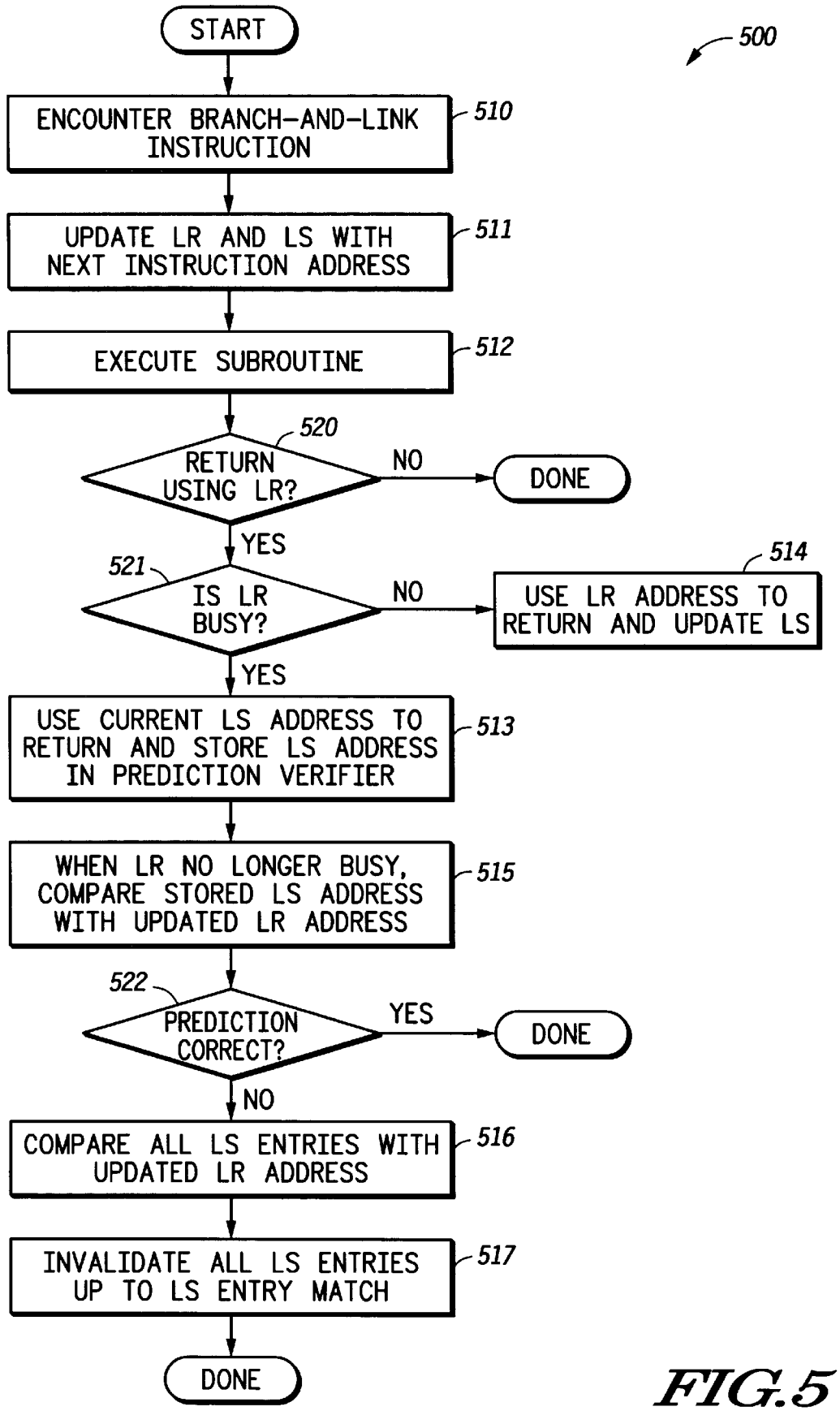
FIG. 5 illustrates, in flow diagram form, a method 500 in accordance with the present invention.

FIG. 5 illustrates a method 500 in accordance with the present invention. The method 500 comprises rectangular action blocks 510 through 517, and diamond shaped decision boxes 520 through 522. Starting at a step 510, a branch-and-link instruction is encountered. Next, at step 511, the link register 440 and the link stack 410 are updated with the address location of the instruction following the branch instruction. This is the address where the program flow will continue upon return from the subroutine.

Referring to FIG. 4, the link register 440 would be updated via the LR UPDATE node which transmits a data value representing the return address which replaces any current value within the link register 440. Additionally, the LR UPDATE node provides the same data to the comparators of the link stack 410. The difference between the LS UPDATE node and the LR UPDATE node is that the link register 440 LR UPDATE node can be used to update just the link register 440 and not the link stack 410. This occurs as illustrated with reference to prior art FIG. 1, where the move-to-link-register (MTLR) command is executed in order to load a register value contained within G3 into the link register 440. When a modification to the link register 440 is to occur directly, such as with a MTLR command, it is not desirable to update the link stack 411. Therefore, it should be understood that the link stack 410 update would receive a subset of the updates the link register 440 would receive. In FIG. 4, the LR UPDATE signal is provided to the comparator portion or the link stack 410. This is because following an update of the link register by a MTLR command, the comparator may be required to synchronize the link stack. In order to synchronize the link stack 410, the comparator portion 425 must be able to receive the value written during an MTLR command to the link register. When data is to be stored in the link stack, it will be provided on the LS UPDATE node.

Next, at step 512, execution of the called subroutine commences. Next, at step 520, a determination is made whether or not the return from the subroutine occurs by using the link register 440. It should be noted, therefore, that it is not necessary to return from a subroutine using the link register 440, and that other program flow redirection means can be used. When a non-link register means is used, the method 500 terminates. However, when the return is done using the link register 440 the flow proceeds to step 521.

At step 521, a determination is made whether or not the link register 440 is busy. The busy bit is active when a move-to-link-register (MTLR) link register 440 instruction has been dispatched, but the new value to be moved to the link register 440 is not yet available. The new value may not be available because it is being retrieved from memory or because an execution unit that is to provide the value has not yet done so. Referring to FIG. 4, the link register 440 is busy when the bit B is in an active state. Note that the active state for bit B can be a logic level zero or a logic level one as specified by system requirements. If the busy bit of the link register 440 is inactive, the flow proceeds to step 514 where the link register 440 address value is used to control the program flow and the link stack 410 pointer is updated in order to reference the next in-sequence location in the stack. If the link register 440 is busy, the flow proceeds to step 513.

At step 513, a situation has occurred where the busy bit is active indicating the link register 440 is not ready to provide a subsequent return address. Therefore, instead of waiting for the link register 440 to be updated, the current link stack 410 address is used as a predicted address value and is provided to the instruction fetcher 450 of FIG. 4. In addition, the predicted address is provided to the prediction verifier 460 in order to verify the predicted value upon the availability of the link register 440 value.

Next, at step 515, when the link register 440 is no longer busy, indicating the link register 440 contains an updated value, a compare occurs within the prediction verifier 460, to determine whether or not the stored predicted value matches the actual value returned to the link register 440. At step 522, a determination is made whether or not the prediction was correct. If the prediction was correct the method 500 is done. However, if the prediction was incorrect, then the predicted address value does not match the actual value and the flow proceeds to step 516. At step 516, a compare of all link stack 410 entries is performed with the actual updated link register 440 value to determine if any link stack 410 location contains the current actual value. In one embodiment of the present invention, the compare step 516 would compare all bits associated with the addresses of the link stack and link register address. In another embodiment, the compare step 516 would compare only a portion of the bits associated with the return addresses.

Referring to FIG. 4, this compare is accomplished by placing an active signal on the COMPARE ENABLE node from the prediction verifier 460 to the link stack comparators 425. The link stack comparators 425 would each individually receive the link register 440 update value as well as the value stored within its associated link stack register. Where a match occurs, the comparator 425 provides the MATCH INDICATOR signal. The MATCH INDICATOR signal is used by the update portion 415 to specify a new stack current value or location. The current stack pointer location would be the next subsequent location from which a subroutine return would be called.

Therefore, referring to FIG. 4, if the link register 440 updated value contained is E+WS, the link stack current location would indicate the previously stored value or D+WS which is where the pointer TOP2 is indicated. By doing so, the values in the link stack 410 of D+WS through A+WS are preserved and can be used to provide valid predictions for subsequent program flow.

In the event multiple matches occur within the link stack 410, the new current location of the link stack 410 will generally be positioned relative the match closest to the existing current location.

Next, at step 517, one embodiment of the present invention will invalidate all entries in the link stack 410 as previously discussed. In another embodiment of the present invention, the link stack 410 will be left unmodified.

When the link stack is left unmodified, it is returned to its state before the prediction occurred. It should be noted, that in an implementation where the link stack is updated upon providing an address value to the prediction verifier 460, the predicted address would need to be returned to the stack in order to leave the stack unmodified. If the stack is updated only after verification of the prediction such an update of the link stack would not be needed to leave the link stack unmodified. By leaving the link stack unmodified, there is an assumption that future subroutine returns will be synchronized with the addresses stored in the link stack 410. By being able to synchronize the link stack 410 considerable savings can be realized over the prior art which requires the link stack 410 to be discarded following a mismatch between the link stack 410 predicted address and the actual address returned to the link register 440.

The ability to either invalidate the contents of the link stack 410 or leave the content unmodified can be a user programmable option. In this situation, a register (not shown) can be used to specify whether to discard the entire cache or to leave the link stack unmodified.

In the foregoing specification, the invention has been described with reference to specific embodiments. However, one of ordinary skill in the art appreciates that various modifications and changes can be made without departing from the scope of the present invention as set forth in the claims below. For example, the term link register is used to generically describe a location on a microprocessor or microcontroller for storing a return address location for altering instruction flow immediately. One skilled in the art will recognize that the link register is but one type of return memory location capable of storing a value for modifying instruction flow. Other types of return memory locations would include the return memory location being a general purpose register used for storing a return address. In another example, the return memory location can consist of a value being loaded from a general purpose stack or heap into a program counter or other memory location. The present invention is useful in whenever the return address value is not immediately available when needed and a prediction using a link stack type mechanism occurs. Accordingly, the specification and figures are to be regarded in an illustrative rather than a restrictive sense, and all such modifications are intended to be included within the scope of present invention. In the claims, means-plus-function clause(s), if any, cover the structures described herein that perform the recited function(s). The mean-plus-function clause(s) also cover structural equivalents and equivalent structures that perform the recited function(s).

What is claimed is:

1. A data processor comprising:
    a return memory location having a return address storage portion coupled to receive an update signal;
    a link stack having
        a plurality of return address storage portions, wherein a first one of the plurality of return address storage portions is a current storage portion;
        a comparator portion coupled to the plurality of return address storage portions for receiving values stored in the plurality of return address storage portions and for providing a match indicator;
        an update portion coupled for receiving the match indicator from the comparator portion and coupled to the plurality of return address storage portions of the link stack;
        an enable node; and
    a prediction verifier coupled to a second one of the plurality of return address storage portions of the link stack and to the return address storage portion of the return memory location, and having an output coupled to the enable node of the link stack for enabling a synchronization of the link stack when the return address storage portion of the return memory location and a predicted address from the link stack do not compare, wherein synchronization of the link stack includes:
        determining if a match occurs between a value stored in the plurality of return address storage portions and a value stored in the return memory location; and providing the match indicator if the match occurs.

2. The data processor of claim 1, wherein the second one of the plurality of return address storage portions of the link stack is the current storage portion.

3. The data processor of claim 1, wherein the plurality of return address storage portions of the link stack comprises a Last In First Out (LIFO), wherein the current storage portion is a LIFO location for storing a next data to be output.

4. The data processor of claim 3, wherein the update portion is for indicating a number of times the LIFO must be popped in order for the link stack to be synchronized with the return memory location.

5. The data processor of claim 1, wherein the update portion modifies a pointer for indicating which of the plurality of return address storage portions of the link stack is the current storage portion, wherein the current storage portion is for storing a next data to be output.

6. The data processor of claim 1, wherein synchronizing includes leaving the link stack unmodified if no match occurs between a value stored in the return memory location, and a value stored in the plurality of return address storage portions.

7. A method for using a link stack in a data processing system comprising the steps of:
    writing a value to an entry of the link stack and identifying the entry as a current entry;
    writing the value to a return memory location;
    reading the current entry of the link stack in an event where the value of the return memory location is invalid;
    when the value of the return memory location becomes valid, comparing a last used current entry of the link stack with the value of the return memory location to get a first comparison result;
    comparing the value of the return memory location with another entry of the link stack to get a second comparison result when the first comparison result is unequal, wherein comparing includes comparing a first predetermined number of bits, wherein the first predetermined number of bits is one of less than or equal to a number of bits of the value in the return memory location; and
    updating the current entry of the link stack in response to the second comparison result.

8. The method of claim 7 wherein the step of comparing the value of the return memory location with another entry of the link stack is repeated for a plurality of entries of the link stack.

9. The method of claim 8, wherein the step of comparing the value of the return memory location with another entry of the link stack includes comparing each entry of the plurality of entries to the return memory location substantially simultaneously.

10. The method of claim 8 wherein the step of updating comprises updating the current entry of the link stack to an entry which is next in sequence to a matched entry.

11. The method of claim 10 wherein the step of updating comprises updating the current entry of the link stack to an entry which is next in sequence to a first matched entry.

12. The method of claim 7 wherein the step of updating includes invalidating all entries in the link stack when the step of comparing results in an unequal comparison result.

13. The method of claim 7 wherein the step of updating includes leaving the link stack unaltered when the step of comparing results in an unequal comparison result.

14. The method of claim 7 wherein the step of writing a value to the return memory location comprises writing a value having a first predetermined number of bits, and wherein the step of comparing the value of the return memory location with another entry of the link stack comprises comparing a second predetermined number of bits which is less than the first predetermined number of bit, and is repeated for a plurality of entries of the link stack.

15. The method of claim 14 wherein the step of comparing the value of the return memory location with another entry of the link stack is repeated until a match is found or all entries are checked.

* * * * *